Sept. 22, 1953     H. E. DARLING     2,653,282
ELECTRIC MOTOR FOLLOW-UP SYSTEM FOR MEASURING
Filed June 28, 1952
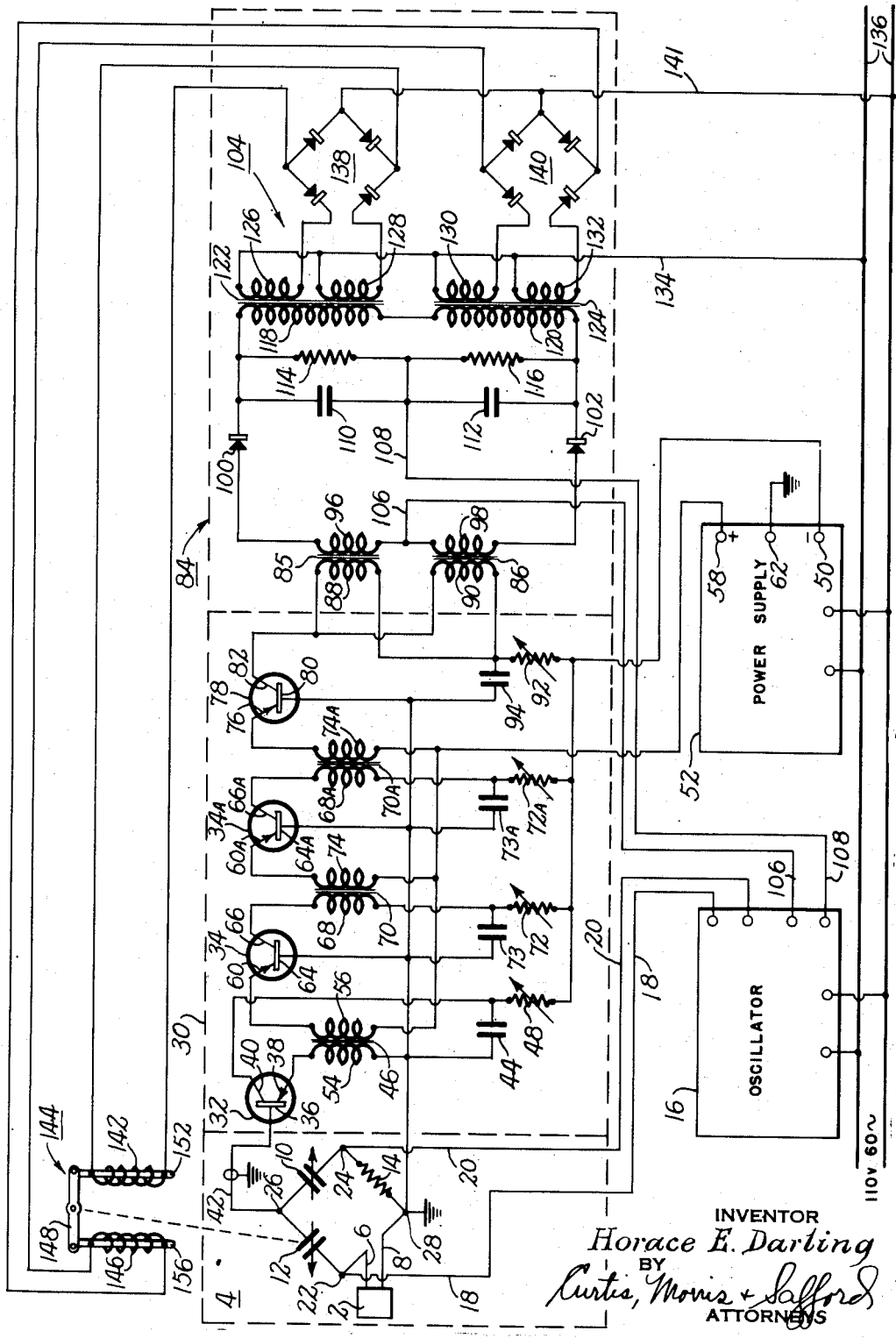
INVENTOR
*Horace E. Darling*
BY
*Curtis, Morris + Safford*
ATTORNEYS Patented Sept. 22, 1953

2,653,282

UNITED STATES PATENT OFFICE 2,653,282

ELECTRIC MOTOR FOLLOW-UP SYSTEM FOR MEASURING

Horace E. Darling, North Attleboro, Mass., assignor to The Foxboro Company, Foxboro, Mass.

Application June 28, 1952, Serial No. 296,227

1 Claim. (Cl. 318—21)

This invention relates to a rebalancing bridge measuring system having minimum dimensions and low heat dissipation and incorporated in a rugged reliable unitary apparatus having wide utility.

In the illustrated embodiment of the present invention, a sensing element forms part of or is connected to a bridge circuit incorporating an adjustable rebalancing condenser. The unbalance signal from this bridge circuit is fed through an impedance-matching isolation stage including a transistor and is amplified by successive transistor elements each having an individual controllable impedance-matching arrangement. This amplified signal is fed into a phase detection circuit incorporating magnetic amplification and applied to a solenoid-operated reciprocating motor connected directly to the rebalancing condenser of the bridge circuit.

It is among the objects of this invention to provide a rebalancing measuring system having minimum size, high sensitivity, good stability, low heat dissipation, and maximum speed of rebalancing.

Other objects, advantages, and aspects of this invention will be in part pointed out in and in part apparent from the following description of a particular embodiment of the invention considered together with the accompanying drawing which shows the schematic diagram of a rebalanceable measuring system incorporating the invention.

A sensing element, indicated in block form at 2, is connected into a balanceable bridge network, generally indicated at 4, by a pair of leads 6 and 8. This bridge network 4 includes a zero-adjusting variable condenser 10, an adjustable rebalancing condenser 12, a resistor 24, and the sensing element 2.

To energize the bridge network 4, an oscillator indicated in block form at 16 is connected by leads 18 and 20 to the energizing terminals 22 and 24 of the bridge circuit 4. This oscillator produces an alternating current signal of suitable frequency, for example 1,000 cycles per second.

The usual circuits for compensating for changes in the ambient temperature may be provided but have been omitted from the drawing in order to simplify it. Other known means can be included also for changing the range or sensitivity of the system.

The unbalance signal appearing at the output terminals 26 and 28 of the bridge circuit 4 is coupled to an amplifier, enclosed within the broken line 30, which makes use of semi-conductor amplifying devices, called transistors.

In order to match the relatively high output impedance of the bridge network to the low impedance of the transistor amplifier circuits and to isolate the bridge circuit from the amplification circuits, a transistor 32 is interposed between the bridge circuit and the first amplifying transistor 34.

The transistor 32 includes a semi-conducting body having a base electrode 36, an emitter electrode 38, and a collector electrode 40. The semi-conducting body may, for example, consist of crystalline germanium or silicon. The base electrode 36 of the transistor is in low resistance or ohmic contact with the crystal and may be a large area electrode. The emitter and collector electrodes 38 and 40 are in rectifying contact with the crystal and may be point contacts or line contacts or they may have a comparatively large area of contact with the crystal.

The unbalance signal from the bridge output terminal 26 is fed through a shielded lead 42 to the base 36 of the transistor 32. The collector electrode 40 is coupled to the common ground circuit through a condenser 44 and thus is maintained at the same A.-C. potential as the other bridge output terminal 28 which is connected directly to the common ground circuit. With this arrangement, the input impedance to the isolation transistor 32 is relatively high and approximately matches that of the bridge network 4. The output signal from the transistor 32 is coupled in a low impedance circuit through a transformer 46 to the transistor 34.

Transistors exhibit relatively wide variations in their characteristics, and furthermore because of the internal mutual impedance coupling effect between the input and output circuits of transistors, they are extremely sensitive to proper and improper impedance matching. This sensitivity makes the impedance matching problem in transistors of more importance than in the case of vacuum tubes and more difficult to accomplish in practical circuits.

Furthermore, transistors have a relatively low input impedance in their emitter circuits and a high output impedance in their collector circuits; so that when more than one successive transistor stage is used in a circuit, or when they are operated out of or into other circuit elements of different impedance, an interstage impedance matching device, such as a coupling transformer is required. Because of the wide variations in their impedance characteristics, the practice has been to match the primary and secondary windings of each inter-stage or coupling transformer to the respective inputs or outputs of the transistors. This necessity for individual matching has limited the use of transistors in commercial measuring apparatus because such individual matching operation is an expensive and time-consuming process. Moreover, commercial production would require the maintenance on hand of large stocks of interstage transformers with different impedance ranges. Thus, a practical way easily and accurately to obtain proper impedance matching in transistor circuits represents an important advance in the art.

In the present circuit, the input and output impedance of each of the transistors is controlled by varying a resistance in the collector circuit to control the current through the transistor. Thus, each of the transistors is matched to the adjacent impedance coupling circuit or to some circuit element. The result is that it is possible to use only one, or sometimes two, standardized impedance coupling arrangements or coupling transformers in production, reducing the labor required to build an instrument and materially decreasing the number and types of transformers which must be kept on hand.

In order to control the input and output impedance of the transistor 32, a variable resistor 48 is connected between the collector electrode 40 and a negative-voltage supply terminal 50 of a conventional rectifier-filter power supply, indicated in block form at 52. The resistor 48 controls the magnitude of the direct current flowing from the emitter 38 to the collector 40, and this current flow in turn affects the internal condition of the transistor 32 so to vary its input and output impedances.

In commercially producing measuring apparatus of this type, the impedances of the individual transistors are matched to standard inter-stage transformers, by adjusting the resistors in the collector circuits of the individual transistors to secure the maximum output. Thus, the correct value for each transistor is quickly determined. This value may be marked in code on the transistor itself, and a fixed resistor of the correct value inserted permanently into the circuit. Whenever a transistor is removed from the circuit and replaced, the corresponding resistor is also replaced, for each transistor and its series resistance or resistances are treated as a unitary circuit component. Considerable time and labor are saved when any transistor is changed, because it is not necessary to change the interstage transformer in order to obtain a proper impedance match with the replacement transistor, even though the characteristics of the replacement transistor may be markedly different from the old transistor.

The primary winding 54 of the transformer 46 is connected between the emitter electrode 38 of the transistor 32 and the common ground circuit. The secondary winding 56 of this transformer is connected between a positive-voltage supply terminal 58 of the power supply 52 and the emitter electrode 60 of the transistor. The voltage between the positive terminal 58 and the grounded power supply return terminal 62 may be a fraction of a volt and the emitter 60 is then biased slightly positive relative to ground.

The base electrode 64 of the transistor 34 is connected to ground; and its collector electrode 66 is connected through the primary winding 68 of a standardized interstage coupling transformer 70 and through an adjustable resistor 72 to the negative-voltage supply terminal 50. A by-pass condenser 73 is connected from the junction of winding 68 and resistor 72 to ground. The value of the resistor 72 is adjusted to produce maximum power output through the secondary winding 74 of the transformer 70.

The next amplifier stage incorporating a transistor 34A may be identical with the stage just described, except that the value of the resistor 72A may be different from that of the resistor 72 because of the difference in the characteristics of the particular transistors that are used.

The output signal from the secondary winding 74A is fed to the emitter 76 of a transistor 78. The base 80 of this transistor is grounded and its collector 82 is coupled into the phase detector and magnetic amplifier, generally indicated at 84, through two interstage coupling transformers 85 and 86, which, for example, may have the same specifications as the transformers 70 and 70A. The primary windings 88 and 90 are connected in parallel. One end of the windings is connected to the collector electrode 82 and the other end is connected through an adjustable resistor 92 to the negative supply terminal 50. A condenser 94 is connected from the junction of the resistor 92 and the transformer windings to ground. The two transformers 85 and 86 may be incorporated into a single unit with a center tapped secondary if so desired.

Although the adjustment of the four resistors 48, 72, 72A, and 92 has been described in a stage-by-stage procedure, it is understood, of course, that in commercial production, the better practice is to assemble the complete amplifier and to apply a low amplitude 1,000-cycle signal from a high impedance source between the base of the first transistor 32 and ground, and then as a single step to adjust these resistors to produce a maximum signal across the secondary windings 96 and 98.

The secondary windings 96 and 98 are connected in series between two half-wave rectifiers 100 and 102 in a phase-detecting circuit, generally indicated at 84.

The amplified unbalanced signal appearing across the secondary windings 96 and 98 is of the same frequency as a comparison signal which is supplied from the oscillator 16 through two leads 106 and 108. These leads are connected to couple the oscillator signal between the junction of windings 96 and 98 and the junction of two filter condensers 110 and 112, which are connected in series between the output electrodes of the half-wave rectifiers 100 and 102. Two resistors 114 and 116 are connected respectively in parallel with the condensers 110 and 112.

The sensing element 2 may be, for example, a resistance bulb or other resistance device that is variable as a function of the condition being measured. Assume that this element 2 causes the bridge 4 to be unbalanced in one direction so that the amplified unbalance signal appears across the secondary windings 96 and 98 where it is combined with the oscillator comparison signal. With one direction of bridge unbalance, the voltage across the secondary winding 96 adds to the comparison voltage from the oscillator 16, whereas the voltage across the other winding 98 is decreased thereby. This produces a larger potential across the resistor 114 than across the resistor 116, so that an unbalance direct current is caused to flow through two series-connected control windings 118 and 120 of transformers 122 and 124, respectively, which are provided with saturable cores and arranged to form a magnetic amplifier. If the bridge 4 is unbalanced in the opposite direction, the phase of the unbalance signal is reversed relative to the phase-comparison signal from the oscillator 16. This reverses the direction of the current through the windings 118 and 120. The control winding 118 is connected in a reverse sense with respect to the winding 120 so that the direction of the control magnetic flux within the magnetic amplifier 122 is opposite to that in the amplifier 124. Each of these magnetic amplifiers has two excitation windings as indicated at 126, 128, 130, and 132. One terminal of each of these windings is connected to a common lead 134 that is connected to one terminal of an alternating current source, such as ordinary power mains 136. The other ends of the windings 126 and 128 are connected to a four-element bridge rectifier, generally indicated at 138. The windings 130 and 132 are connected to a bridge rectifier, generally indicated at 140. The other one of the power mains 136 is connected to the bridge circuits 138 and 140 by a lead 141 as shown.

The windings 126, 128, 130, and 132 are all connected so that their turns are in the same sense, thus, assuming that a control current caused by the unbalance of the bridge 4 is flowing in a given direction through the control windings 118 and 120, the cores of the amplifiers 122 and 124 are magnetized in opposite directions relative to the pairs of excitation windings 126 and 128, and 130 and 132, respectively. Thus, during each half cycle of the current from the mains 136, a relatively large surge of current is allowed to flow alternately through the windings 126 and 128, through the rectifier circuit 138, and a winding 142 of a solenoid motor, generally indicated at 144. But only a relatively small current flows through the windings 130 and 132, the bridge circuit 140, and the other motor winding 146.

The current which flows through the windings 126 and 128 is such that this current flow further increases the magnetic saturation of the core of the amplifier 122, and hence it meets a lower inductance. However, the current which flows through the windings 130 and 132 is reduced because it acts to decrease the magnetic saturation of the core of the magnetic amplifier 124, and hence is opposed by a larger inductance.

If the direction of the control current is reversed, the current through the windings 130 and 132 is increased and that through the windings 126 and 128 is decreased.

The relative amounts of current which flow through the motor windings 142 and 146 control the position of a pivotally supported beam 148 that is connected at each end to the cores 152 and 156 of the solenoids 142 and 146. The beam 148 is coupled directly to the condenser 12 and adjusts the condenser in such direction as to rebalance the bridge 4, and thus decrease the unbalance signal. The motor 144 may be used also to control suitable indication means, recording means, or control means for the industrial process involved.

The cores 152 and 156 are arranged to extend at all times into the solenoids 142 and 146 sufficiently far to be within the region wherein the pull exerted by the solenoid winding is substantially independent of the core position. These conditions are not difficult to realize in practice, because there is a substantial distance within each solenoid over which the pull is uniform. See, for example, Electrical Engineers' Handbook, Harold Pender, Editor in Chief (John Wiley & Sons, Inc. 1936) Sec. 4-35 and 4-36. Thus, it is clear that no net torque will act on the beam 148 so long as the currents through the windings 142 and 146 are equal, irrespective of the position of the beam 148. And whenever the currents through the windings 142 and 146 become unequal due to an unbalance signal from the bridge network 4, the beam 148 is moved to a different position to rebalance the network 4 and hence to equalize the currents through the windings 142 and 146. Since these currents through solenoids 142 and 146 are again equal, there is no longer any net force on the beam 148, and the motor 144 balances in this new position.

A damping means such as a mechanical dash pot may be attached to the beam 148 to prevent the motor 144 from oscillating across the balance position when the system is adjusted for very high sensitivity.

I claim:

A measuring system comprising a high-impedance bridge circuit having input terminals and output terminals and including a variable condenser for rebalancing the bridge, condition-responsive sensing means connected to and forming part of said bridge circuit, signal generating means connected to said input terminals for energizing the bridge circuit with alternating current, a first transistor having a base electrode connected to said first output terminal of said bridge circuit, an interstage transformer having primary and secondary windings, circuit means connecting said primary winding between said second output terminal and the emitter electrode of said first transistor, amplification means coupled to the secondary winding of said interstage transformer and including a second transistor having a base electrode connected to said second output terminal of said bridge circuit, a source of voltage supply having at least two supply terminals, circuit means connecting said secondary winding of said transformer between the emitter electrode of said second transistor and the first of said voltage-supply terminals, and means connecting the second of said voltage-supply terminals to the collector electrodes of said first and second transistors and including first and second separate manually-adjustable resistance means in series respectively with said collector electrodes, phase-detecting means coupled to said signal generating means and to the output of said amplification means, direct-current amplification means connected to the output of said phase-detecting means, and reciprocating motor means connected to the output of said amplification means and to said adjustable rebalancing condenser.

HORACE E. DARLING.

References Cited in the file of this patent

UNITED STATES PATENTS

| Number | Name | Date |
|---|---|---|
| 2,476,496 | Kliever | July 19, 1949 |